INVENTOR.
ARTHUR L. LOEB

*INVENTOR.*
ARTHUR L. LOEB
ATTORNEYS

Feb. 13, 1968  A. L. LOEB  3,368,290
INSTRUMENT FOR REPRESENTATION OF CRYSTAL STRUCTURE
Filed Oct. 23, 1965  6 Sheets-Sheet 3

*INVENTOR.*
ARTHUR L. LOEB
BY
Kenway, Jenney & Hildreth
ATTORNEYS

INVENTOR.
ARTHUR L. LOEB

Feb. 13, 1968  A. L. LOEB  3,368,290
INSTRUMENT FOR REPRESENTATION OF CRYSTAL STRUCTURE
Filed Oct. 23, 1965  6 Sheets-Sheet 5
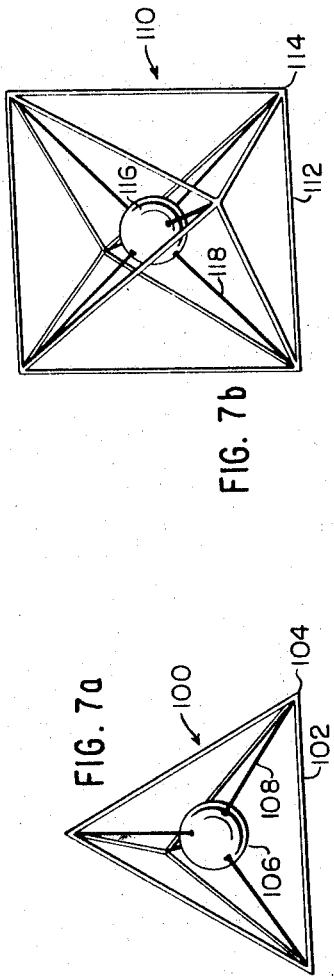
FIG. 7a
FIG. 7b
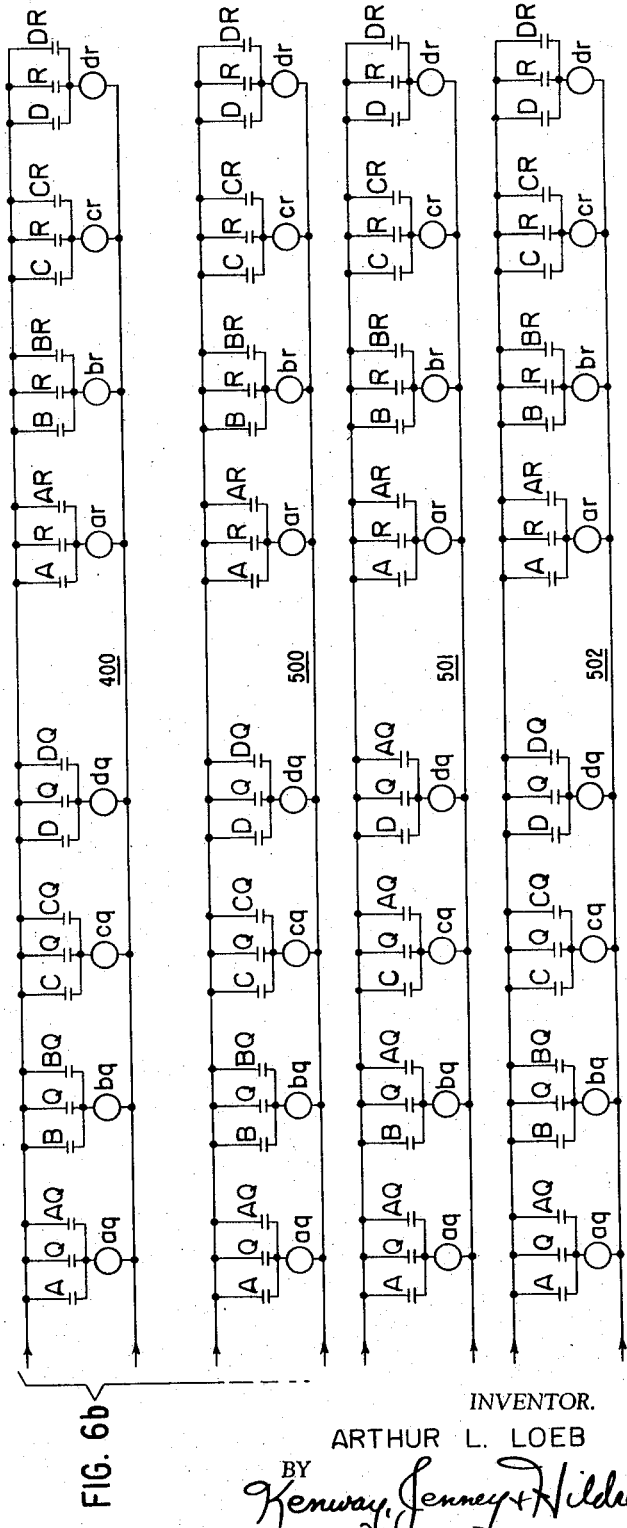
FIG. 6b
INVENTOR.
ARTHUR L. LOEB
BY
Kenway, Jenney + Hildret
ATTORNEYS

United States Patent Office 3,368,290
Patented Feb. 13, 1968

3,368,290
INSTRUMENT FOR REPRESENTATION OF CRYSTAL STRUCTURE
Arthur L. Loeb, Cambridge, Mass., assignor to Kennecott Copper Corporation, New York, N.Y., a corporation of New York
Filed Oct. 23, 1965, Ser. No. 503,771
14 Claims. (Cl. 35—18)

ABSTRACT OF THE DISCLOSURE

A device for representing crystal structures consists of a display panel having actuatable indicators located to provide a visual representation of the location of atom sites in a crystal. The indicators are arranged in groups which represent individual planes in the crystal, and each group is composed of subgroups which represent a fraction of the sites in the group. Selector means provide for the selective actuation of both the subgroups and groups so that one or more subgroups may be displayed for any desired plane.

My invention relates to an instrument for the representation of crystal structures. More particularly, it relates to an instrument for the representation of crystal structures in which the atom sites in one or more crystal planes are represented by visual sources which may be selectively energized in groups. My invention is particularly useful for the representation of crystals in which at least some of the atoms or ions of the crystal are closely packed.

Crystal structures containing closely packed atoms or ions occur frequently in nature and form an important class of chemical structures; it has been estimated that approximately 90% of all inorganic chemicals known to man contain at least some closely packed atoms or ions. In constructing models to represent such crystals, it is convenient to use an hexagonal axis system instead of the conventional rectangular coordinate system. In the hexagonal system, three axes which make angles of 120° with each other are used to represent direction and distance in a plane while a fourth axis perpendicular to the other three represents direction and distance in the third dimension. These axes are conventionally labeled the U, V, W and Z axes. A hexagonal net may be formed by selecting any two of the three co-planar axes, for example, the U and V axes, and drawing sets of lines perpendicular to and co-planar with the respective axes and spaced a fixed distance apart.

If the atoms in the crystal structure are considered to be individual spheres, a closely packed structure may be represented by placing a single sphere at the intersection of the lines of each set in the hexagonal net. To form a three dimensional representation of a closely packed structure, additional layers of such closely packed planar structures may then be stacked one on top of the other. From geometrical considerations it will be seen that the second layer can be closely packed on top of the first layer in only one unique fashion, while the third layer can be closely packed above the first two such that the centers of the sphere in the third layer lie directly above those in the first (hexagonally closely packed) or such that the centers of the spheres of the third layer lie directly above the void spaces between the atoms of both the first and second layers (cubically closely packed). As more layers are added to the closely packed structures thus formed, it will be found that the centers of the spheres of the additional layers lie directly above the centers of the spheres of one of the first three layers. Accordingly, it will be seen that three planes, each of which contains a hexagonal net, are adequate to represent the closely packed atoms in any crystal structure in which at least some of the atoms are closely packed. These planes, which will hereinafter be called D, E and F planes, are identical to each other geometrically but the hexagonal nets lying in these planes are shifted with respect to each other along one of the coordinate axes.

In crystals containing two or more different types of atoms, it will be found that the atoms in the crystal are not electrically neutral but instead exist as electrically charged atoms or ions. Recent investigations into the limitations on the distribution of the ions throughout the crystal imposed by stability considerations have revealed the fact that these ions are distributed throughout the crystal in a definite manner. In fact, if one type of ion in the crystal is closely packed, either cubically or hexagonally, it will be found that the oppositely charged ions lie in planes between the closely packed ions and have centers which lie above the centers of the ions in one of the three layers used to represent the closely packed ions. Thus the planes representing the locations of closely packed ions also suffice to represent the locations of the ions which lie between the closely packed ions. Morris and Loeb, "A Binary Algebra Describing Crystal Structures With Closely Packed Anions," Acta Crystallographics, vol. 13, p. 434 (1960). Ions located between closely packed layers will hereinafter be referred to as "interstitial ions" and their location in the crystal as "interstitial sites."

It has further been determined that there are two types of interstitial sites, namely, those at the center of octahedra having closely packed ions at their corners (octahedral sites) and those at the center of the tetrahedra having closely packed ions at their corners (tetrahedral sites). The octahedral sites lie midway between adjacent close-packed planes while the tetrahedral sites lie midway between the octahedral sites and the closely packed planes. Morris and Loeb, supra. Ions in octahedral sites are known as octahedrally coordinated ions while those in tetrahedral sites are known as tetrahedrally coordinated ions. The location of closely packed atoms may thus be represented in three dimensional space by the corners of octahedra and tetrahedra which have been stacked in a manner to be described below; the location of interstial sites occupied by ions will thus be represented by octahedra or tetrahedra having spheres at their respective geometric centers to represent the ions ("filled" octahedra or tetrahedra) while the unoccupied sites will be represented by octahedra or tetrahedra which do not contain such spheres ("empty" octahedra or tetrahedra). If the tetrahedron is rested on a flat surface with one of its faces serving as a base, the tetrahedron will be considered to be in an "upright" position. If, on the other hand, the tetrahedron is placed on one of its vertices, with the face opposite the selected vertex parallel to the flat surface, the tetrahedron will be considered to be in an "inverted" position. In representing the crystal, the tetrahedra may be placed in an upright position (vertex located above the base) or in an inverted position (vertex located below the base). This will be made more apparent in the detailed description which follows.

In general, the chemical formula of a crystal in which part of the ions are closely packed while the remainder occupy the interstices is given by $A_{2xn} B_{yn} X_n$ where A represents the tetrahedrally coordinated ions, B the octahedrally coordinated ions, X the closely packed ions, $x$ the fraction of tetrahedral interstices occupied, $y$ the fraction of octahedral interstices occupied, and $n$ is an integer. From knowledge of the above, one may generate any crystal structure containing closely packed ions if the chemical formula, the mode of packing (cubic or hexagonal) of the closely packed ions and the coordination (octahedral or tetrahedral) of the interstial ions is known.

The following table summarizes the type of plane on which the centers of the closely packed and interstitial ions for both cubic and hexagonal stacking project.

TABLE 1

| Type of Ion | Type of Plane on which Ion Projects | |
| --- | --- | --- |
| | Cubic Packing | Hexagonal Packing |
| Closely Packed Ion | D | D |
| Tetrahedral Interstice (upright) | E | E |
| Octahedral Interstice | F | F |
| Tetrahedral Interstice (inverted) | D | D |
| Closely Packed Ion | E | F |
| Tetrahedral Interstice (upright) | F | D |
| Octahedral Interstice | D | F |
| Tetrahedral Interstice (inverted) | E | E |
| Closely Packed Ion | F | D |
| Etc. | Etc. | Etc. |

Various methods of representing crystal structures may be utilized. Prior structures for representing crystals utilized spheres to represent the location of atoms within the crystal, the spheres being joined together by means of interconnecting rods or by means of flat plates to which the spheres were attached, the plates then being stacked one on top of the other to represent the crystal in three-dimensional space. Such structures suffer from the disadvantage that a large amount of time and energy is often required to represent the crystal structure due to the necessity of individually filling each atom site to be represented with a sphere of the proper size or color for the different type of atoms under consideration and due to the necessity for constant reference to the mathematical model or other description of the crystal structure during construction of the model.

Accordingly, it is an object of my invention to provide an instrument for the representation of crystal structures. A further object of my invention is to provide an instrument for crystal structure representation which is simple to use and which allows a large number of crystal structures to be rapidly represented. Still another object of my invention is to provide an electrical device for crystal structure representation in which the inherent symmetry of crystal structures is incorporated into the model and utilized to maximum advantage. Yet another object of my invention is to provide a device which may readily be used in conjunction with tetrahedra and octahedra modules to construct models of crystal structure.

One feature of my invention resides in the utilization of visual sources for the representation of the atom sites, these sources being selectively energized by an operator at a selection panel. This arrangement reduces the expenditure of time required in the physical manipulation for representation of the atom sites. Another feature of my invention resides in the grouping of a number of visual sources in predetermined groups which correspond to the allowable physical locations of atom sites in crystal structures. A further feature of my invention resides in the utilization of an electric switching panel for controlling the construction of a crystal structural model, thus allowing the operator to manipulate the physical structure at a distance. This feature allows the model to be viewed by an audience unhindered by the manipulations of the person displaying the model.

Other and further objects and features of my invention will become more readily apparent in the following detailed description of a preferred embodiment thereof which has been selected for puropses of illustration and which is shown in the accompanying drawings in which:

FIGURES 6a and 6b show the electrical circuitry utilized in the control panel for forming models of crystal structure;

FIGURES 7a and 7b are perspective views of "filled" tetrahedra and octahedra respectively.

In accordance with my invention I provide an electrical instrument for the representation of atom sites in crystals which utilizes the symmetry possessed by the crystal structure. In one embodiment of my invention the instrument consists of a two dimensional display panel of translucent material to which is attached a number of visual sources, there being one such source for each atom or ion site to be represented. The visual sources may be considered to be divided into groups and subgroups, there being one group of sources for each crystal plane to be represented, each such group being divided into subgroups for that particular plane. A selector panel attached to the display panel contains a series of electrical switches by means of which the operator can "construct" a wide variety of crystal structures in a rapid fashion.

In the preferred embodiment of my invention the visual sources comprise light bulbs which lie essentially in a single plane and the crystal model thus comprises a two dimensional projection of the three dimensional crystal structure.

Figure 1:
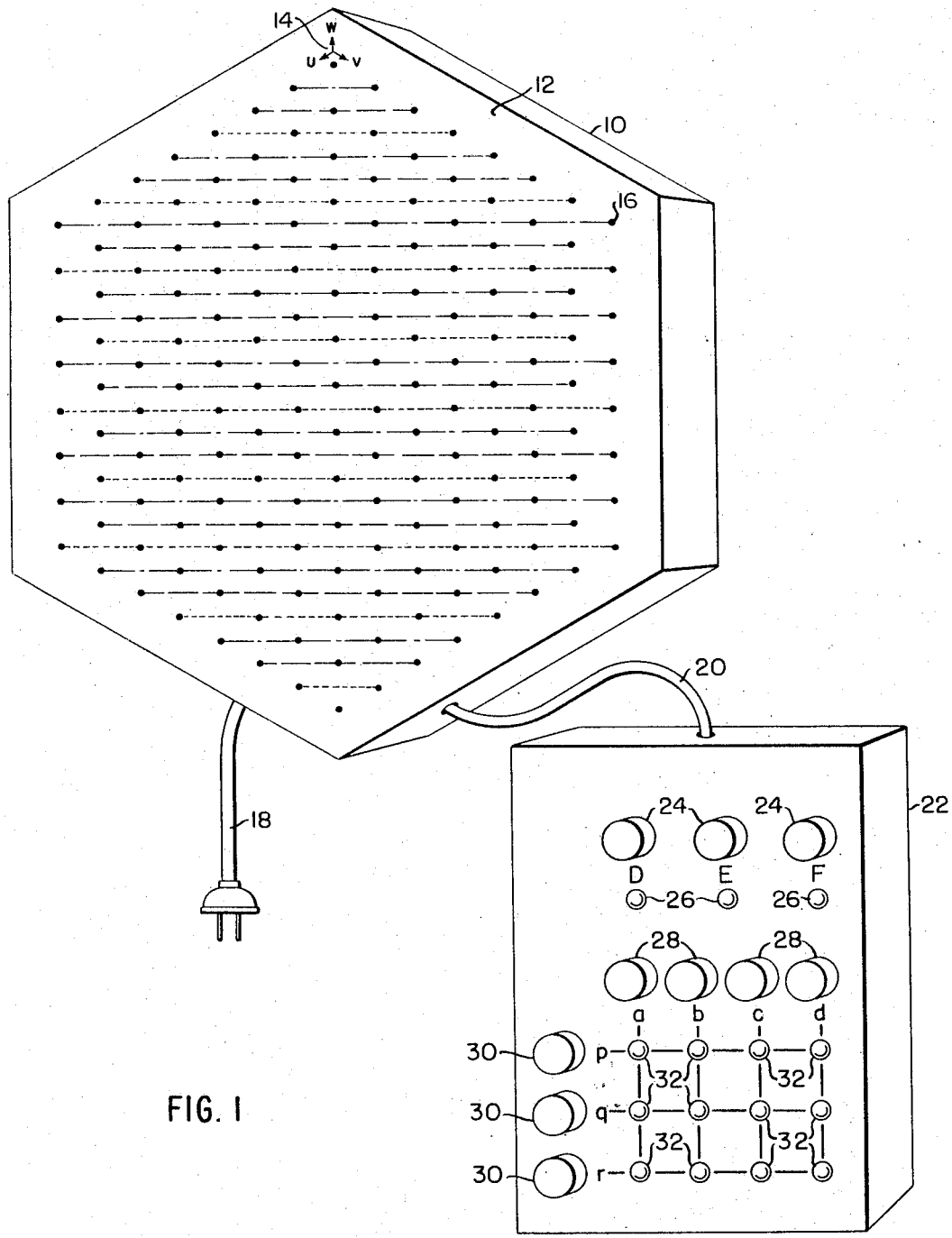
FIGURE 1 is a pictorial representation of one embodiment of an electrical device for representing crystal structure showing a display panel and a selector panel.

Referring now to the drawings, FIGURE 1 is a pictorial representation of one embodiment of my invention. A display panel 10 carries a translucent surface 12 which may, for example, be constructed of Lucite or other similar material. The display panel is constructed in the form of a regular hexagon and contains hexagonal axes 14 inscribed or painted on the surface of the panel. Indicator sources 16 are arranged at the intersections of a net of lines parallel to the U and V axes 14 respectively; the sources 16 may be any source that will provide a visual representation of an atom site and which has two states, these being an "ON" state and an "OFF" state. The sources may thus be mechanical (for example colored areas or cross polarizers which are actuated by means of a shutter arrangement) or electrical (for example, a light bulb or other light source; for purposes of simplicity and economy, it is preferred to use light sources. The panel 10 is connected to a power source by means of an electrical connector cord 18 and to a selector panel 22 by means of an electrical power cord 20. Plane selector switches 24 are contained in the selector panel and are used to select a particular hexagonal net corresponding to a particular crystal plane for display; indicator lights 26 indicate the planes which are being displayed at any given time. The selector panel also contains column subgroup switches 28 and row subgroup switches 30 arranged in the form of a matrix, having rows and columns, each of these switches being associated with a particular subgroup of lights on the panel 10. These switches select the particular subgroups of atom sites that are to be displayed in each plane. As shown, these switches are two-position push button switches; a given switch is closed by pressing one of the push buttons 28 or 30 a first time and is opened by pressing the same button a second time. Indicator lights 32 identify the subgroups which have been selected for display. In the specific embodiment shown in FIGURE 1, the display panel is divided into three groups each of which corresponds to one of the D, E or F planes, and into 36 subgroups, there being twelve subgroups for each group. For convenience, the subgroups for each plane are identified as the ap, aq, ar, bp, bq, br, cp, cq, cr, dp, dq, and dr subgroups respectively. Of course, each group representing a plane may be divided into a greater or lesser number of subgroups as desired.

The internal circuitry of the selector panel 22 is such that the D, E and F planes may be displayed either singly or concurrently by operating ("Closing") switches 24. Once a particular plane is selected for display by closing one of the switches 24, and with all column switches 28 and row switches 30 initially open, operation of one or more column switches or one or more row switches will cause the display of that portion of the lights 16 associated with the respective column or row, while operation of both column and row switches concurrently will cause the display of that portion of the lights 16 associated with both the columns and rows so selected. For example, if the column switch 28 associated with the "a" column is depressed, the ap, aq, and ar subgroups will be displayed on the display panel 10 and the lights 32 in the "a" column will be illuminated to indicate that these subgroups are being displayed. Similarly, if the row switch 30 associated with the "p" row is depressed, the ap, bp, cp, and dp subgroups will be displayed on display panel 10 and the lights 32 in the "p" row will correspondingly be illuminated. If, however, both switch 28 associated with the "a" column and switch 30 associated with the "p" row are depressed concurrently, only the ap subgroup will be displayed and the corresponding light at the intersection of the "a" column and "p" row will be illuminated. This will be made more apparent below in connection with the detailed description of FIGURES 6a and 6b.

As shown in FIGURE 1, the selector panel 22 contains provisions for selecting three crystal planes for display, these planes being identified as the D, E and F planes which are selected by the plane selector switches 24. As will be seen more fully in connection with FIGURES 2 through 4, the indicator lights 16 are arranged in the form of planar hexagonal nets to represent the closely packed ions or atoms in the crystal, there being three such nets located on the display panel 10. As previously stated, the locations of the interstitial ions of a crystal will also project onto these nets. In the crystal structure itself, these nets would, of course, be located on different levels within the crystal; in the embodiment shown in FIGURE 1, however, the indicator lights for each of these nets lies in a single plane, thus providing a two dimensional projection of the three dimensional crystal structure. The individual lights in the group which represents the D plane are shown connected together in the drawings by long dashed lines for ease of identification; the lights in the groups representing the E and F planes respectively are shown connected together by chain lines and by short dashed lines respectively. It will be understood that these connecting lines are inserted in the drawings solely for the purpose of showing the relative location of the lights representing the various crystal planes. In practice, these lines do not appear on the display panel; the different crystal planes are instead represented by lights of different colors. For example, the D plane may be represented by white lights, the E plane by red lights, and the F plane by blue-green lights. The number of lights used in representing each of these planes will, of course, depend on the size of the display srceen; illustratively, in FIGURE 1, 55 white lights were used to represent the D plane , 57 red lights were used to represent the E plane, and 57 blue-green lights were used to represent the F plane.

As stated previously, the hexagonal nets for one or more of the crystal planes containing the interstial ions may be only partially occupied. In order to allow for the representation of partially occupied hexagonal nets, the switches 28 and 30 are provided on the selector panel 22. These switches are arranged in the form of a matrix, the column switches 28 being labeled a, b, c and d respectively and the row switches 30 being labeled p, q, and r respectively. The switches 28 and 30 divide each of the three hexagonal nets into 12 subgroups of indicator lights, thus allowing the operator to construct models of crystals in which the nets of a given crystal plane are only partially occupied. The indicator lights 32 provide a visual indication to the operator as to which of the subgroups of atom sites in a crystal plane are being displayed on the panel 10 while the indicator lights 26 provide a visual indication of the crystal planes which are being displayed. It will be apparent that a greater or lesser number of row and column switches may be provided to divide the hexagonal net representing a given crystal plane into any number of subgroups desired.

Figure 2:
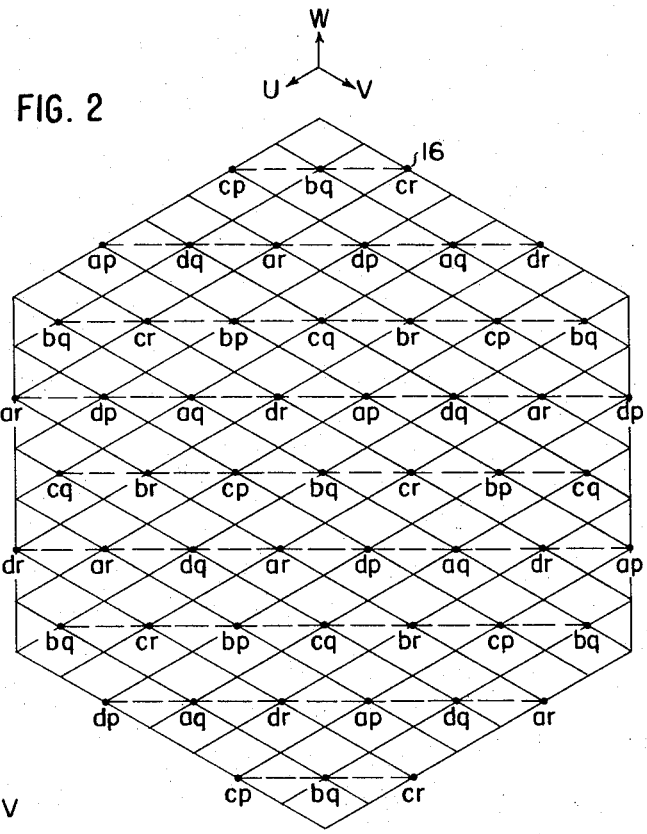
FIGURES 2, 3 and 4 are schematic views of the display panel of FIGURE 1 showing the arrangement of the light sources for representing the D, E and F planes respectively.
Figure 3:
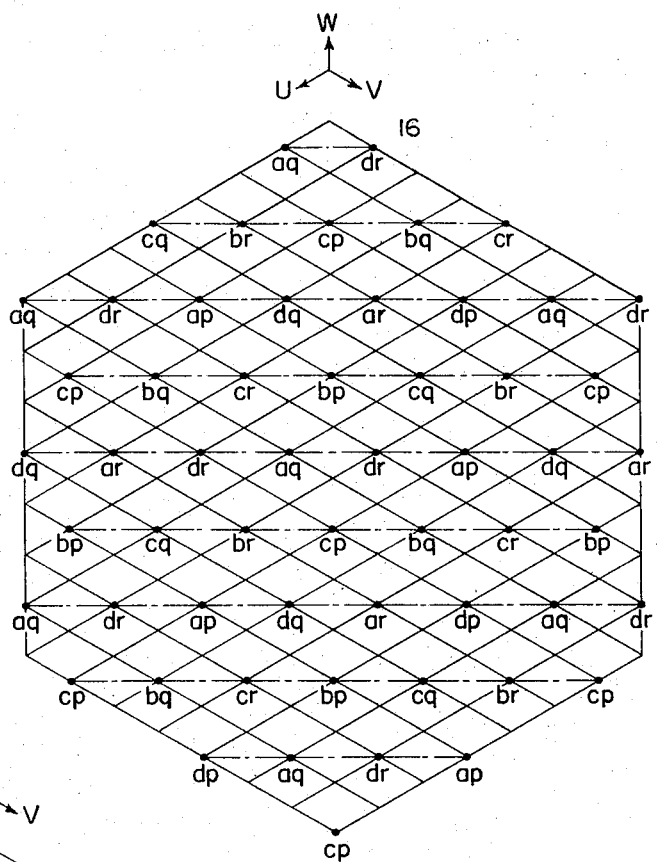
Figure 4:
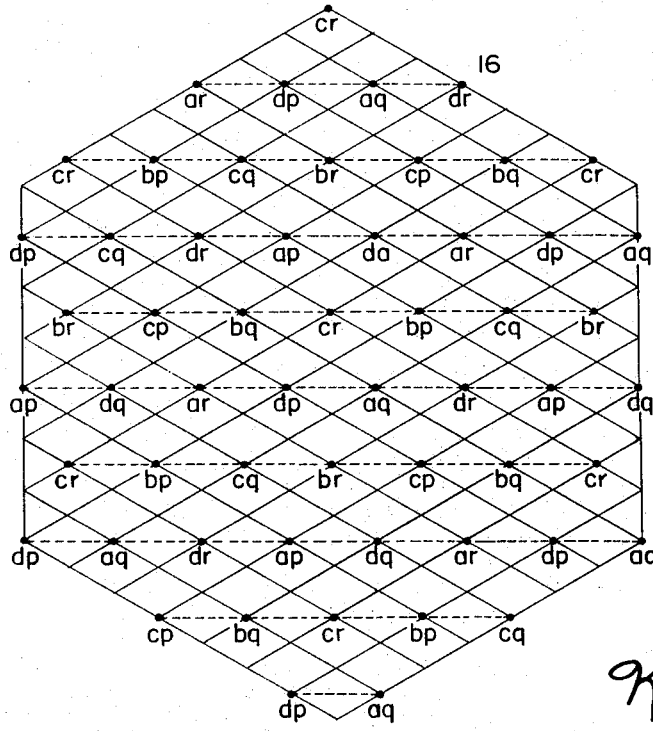

The actual division of the display panel 10 into groups and subgroups is shown in FIGURES 2 through 4, each of which shows the locations of the light sources 16 for one of the D, E and F planes respectively. For the sake of convenience, the light sources in these figures are identified by two letters, the first of which identifies the particular column switch 28 associated with the light source on the selector panel 22 and the second of which identifies the particular row switch 30 associated with that light source. Since there are twelve switching combinations available with the three by four switching matrix on the selector panel 22, it will readily be seen that each of the planes is divided into twelve subgroups, each subgroup containing a number of light sources. It will be noted that the light sources belonging to a particular subgroup within a hexagonal net are equidistant from the six nearest light sources belonging to that same subgroup; in FIGURES 2 through 4 for example, this distance is six units along any of the hexagonal axes. It will also be noted that if the hexagonal nets of FIGURES 2 through 4 are superimposed, the light sources shown in these figures will fill the resulting hexagonal net as shown in FIGURE 1. The distribution pattern shown in FIGURE 3 was derived from that shown in FIGURE 2 by a translation of two units along the V direction; the distribution pattern shown in FIGURE 4 may be derived from that shown in FIGURE 2 by a translation of two units in the negative V direction. An explanation of the method of dividing the hexagonal net into subgroups is found in the Morris and Loeb article cited above.

Figure 5:
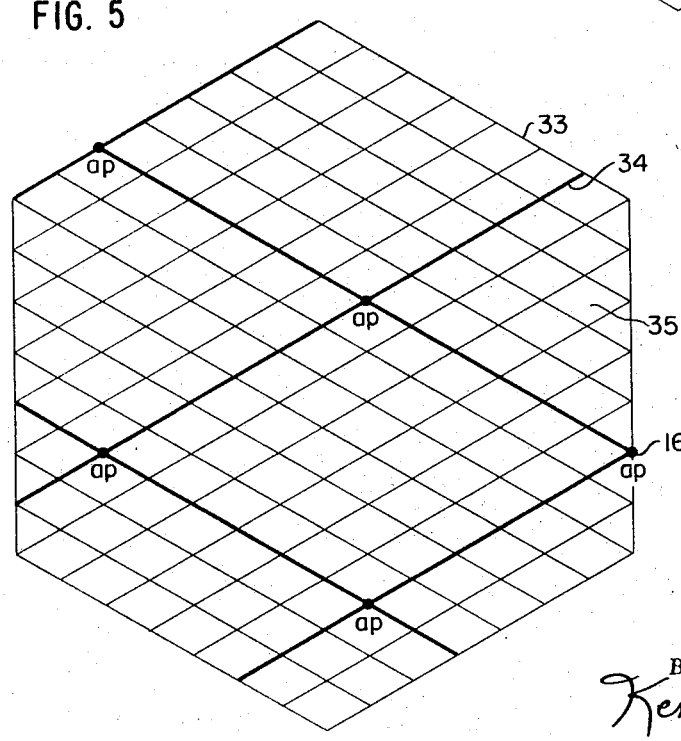
FIGURE 5 is a schematic view of the display panel of FIGURE 1 showing the subgrouping of one particular set of indicator lights for a given plane.

In FIGURE 5 of the drawings, a subgroup of the D plane is shown more clearly. The points ap in the subgroup are evenly distributed over the hexagonal net 33 and any point in the subgroup is equidistant from the nearest neighboring points in the same subgroup. The distribution of these points is such that lines 34 joining the points will form hexagonal meshes having an area greater than the area of the meshes 35 of the net 33.

Figure 6A:
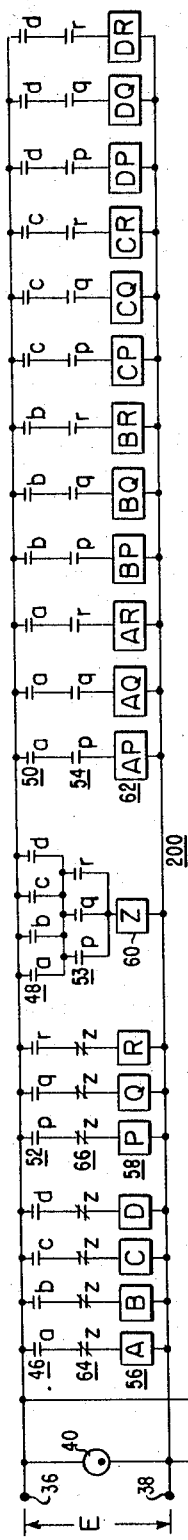

Referring now to FIGURES 6a and 6b, the electrical circuitry for the operation of the display panel of FIGURE 1 is shown. An input voltage E applied to the input terminals 36 and 38 is regulated by glow tube 40 and is then applied to display control switching unit 200, selector panel switching unit 300, and the input side of transformer 80. Connected to the output side of the transformer are selector panel indicator unit 400 and display panel indicator units 500, 501, and 502. The selector panel switching unit 300 contains column subgroup switches 28 and row subgroup switches 30 which are shown as single pole, single throw switches. Selector relays 42 and 44 are controlled by the switches 28 and 30 respectively, the closure of any one of these switches activating the corresponding relay by connecting it across the power supply at the input terminals 36 and 38. Associated with the selector relays 42 and 44 in the selector panel switching unit 300 are the relay operated switches 46, 48, 50, 52, 53 and 54 in the display control switching unit 200. These switches are normally open and are moved to a closed position when the corresponding selector relays 42 and 44 are energized. Thus, for example, closure of switch a in the subgroup switch unit 28 operates relay a in the selector relay unit 42, thus closing switch a in the relay operated switch units 46, 48 and 50.

In series with the column switches 50 in the display control switching unit 200 are the row switches 54 and the display relays 62; the relays are operated when one or more column switches 50 and one or more row switches 54 are closed concurrently. Coincidence relay 60 is also energized via switches 48 and 53 when this condition exists, thus opening normally closed coincidence switches 64 and 66 and preventing the energization of column and row display relays 56 and 58 respectively. The latter relays are energized only when one or more of the row switches or one or more of the column switches, but not both, are operated.

The stacking D, E and F selector switches 24 in the display panel indicator units 500–502 energize the stacking selectors relays 68, 70 and 72 respectively, as well as illuminating the corresponding stacking switch indicator lights 26 and connecting the appropriate one of the display panel indicator units 500–502 to the transformer 80. Closure of any one of the stacking selector switches also connects the selector panel indicator unit 400 to transformer 80. Indicator lights 32 are placed in series with selector panel indicator switches 82 while display light groups 88, 92 and 96 are placed in series with display indicator switch groups 86, 90 and 94.

The operation of the circuit of FIGURES 6a and 6b is as follows. A particular plane, for example the D plane, is selected for display by closing the appropriate one of the switches 24; this will display all the atom or ion locations belonging to that particular plane. If a plane that is only partially occupied is to be represented, the subgroup switches 28 and 30 must then be used. Starting with the column and row subgroup switches 28 and 30 open, one of the switches, for example, column subgroup switch $a$, is closed. Closure of this switch energizes the selector relay $a$ in relay group 42 which in turn closes the relay operated switches $a$ in the switch groups 46, 48 and 50. Since none of the row subgroup switches 30 have been closed, the row relay-operated switches in switch group 54 will remain open, thereby preventing any of the subgroup display relays 62 from being energized. Similarly, the coincidence display relay 60 will remain unenergized and the normally closed coincidence display switches 64 will remain in the closed position, thus allowing relay A in column display relay unit 56 to be energized. The switches A in the selector panel indicator switch group 82 and in the display panel indicator switch group 86 will thereupon close, thus connecting the subgroup indicator lights associated with the respective A switches across the secondary of the transformer T to illuminate these lights. As will be seen in FIGURES 6a and 6b, three indicator lights 32 in the selector panel indicator unit 400 will be illuminated at this time, these indicator lights being labeled $ap$, $aq$, and $ar$. Since the D plane switch 24 is also closed, the $ap$, $aq$ and $ar$ display lights in the display panel light group 88 will also be illuminated. Thus, one-quarter of the D-plane display lights on the display board 10 will be illuminated, indicating the position of atoms or ions in a plane which is one-quarter occupied.

A similar sequence of events occurs if one of the row switches 30 is closed instead of one of the column switches 28. In this case four subgroup lights will be illuminated on the selector panel and four lights will be illuminated on the display panel, these lights being labeled $ar$, $br$, $cr$ and $dr$, thus representing a plane which is one-third occupied by atoms or ions.

If one or more row switches and one or more column switches are closed concurrently, the coincidence display relay 60 will be energized and will open the normally closed relay-operated switches 64 and 66, thus preventing the energization of the column and row display relays 56 and 58 respectively. One or more of the display relays 62 will, however, be energized, the particular relays that will be energized being dependent on which of the switches 28 and 30 are closed. Assuming that the $a$ and the $p$ switches only in the switch units 28 and 30 are closed, the AP display relay in relay unit 62 will be energized; this will close the AP selector panel indicator switch 82 in indicator unit 400 and will also close the AP relay 86 in the display panel indicator unit 500. Closure of these switches will illuminate the $ap$ subgroup indicator light in the light group 88. In general, closure of one or more row switches only will cause the display of all subgroups associated with the respective rows, closure of one or more column switches only will cause the display of all subgroups associated with the respective columns, and closure of one or more row switches and one or more column switches concurrently will cause the display of all subgroups associated with both the respective rows and the respective columns. Due to this "matrix" configuration, it will be found that certain fractional multiples of the indicator lights cannot be directly displayed; thus, it is not possible to *directly* display $5/12$, $7/12$, $10/12$, and $11/12$ of the indicator lights in the display panel with the switching matrix so far described. A $10/12$ fractional multiple of the indicator lights in a given plane may be displayed *indirectly* by first marking the location of all the indicator lights in the given plane and then displaying the $2/12$ fractional multiple; the $10/12$ fractional multiple then occupies all those indicator light locations which are marked but not illuminated. A similar procedure may be followed to locate the $11/12$ fractional multiple. Alternatively, the circuit of FIGURE 8, which will be described in more detail below, may be used to display all the fractional multiples of the indicator lights.

Although only a single light source has been shown for each of the display panel indicator sources 88, 92 and 96, it will be understood that any desired number of lights may be placed in parallel with those shown. The exact number of light sources used in the practice of my invention may be readily obtained from FIGURES 2 through 4 which show the distribution of these light sources over the hexagonal net for each of the planes which are represented.

As so far described, I have shown how my invention may be used to represent the locations of closely packed atoms or ions in a given plane and also to represent the locations of the interstitial ions between the closely packed atoms or ions. To assist in understanding how a model of the three dimensional crystal structure may be constructed with the aid of my invention, the construction of a model for the compound cuprite will now be illustrated. The chemical formula of cuprite is $Cu_2O$; the copper ions are cubically closely packed and the oxygen ions are tetrahedrally coordinated. Matching the cuprite formula with the general formula for compounds containing closely packed atoms or ions, $A_{2nx} B_{ny} X_n$, where X represents the closely packed atoms or ions, A the tetrahedrally coordinated interstitial ions, and B the octrahedrally coordinated interstitial ions, we find that $n=2$, $y=0$ (since there are no octrahedrally coordinated ions in this compound), and $2nx=1$. Solving for $x$, we find that $x=\frac{1}{4}$; accordingly, the tetrahedral sites are one quarter occupied. Since the copper ions are cubically closely packed, we find from Table 1 that these ions lie in a D plane. The location of these ions is then displayed by closing the D plane selector switch 24 and ensuring that all the column switches 28 or all the row switches 30, or both, are closed. This will ensure the display of all the lights in the D plane consisting of 59 lights which are all the lights identified in FIGURE 2.

Starting with the first layer and proceeding plane by plane, the location of these ions may be marked by placing spheres representing the centers of the illuminated lights above and by joining these spheres with rods representing the bonding forces between the atoms or ions. Again referring to Table 1, we find that the oxygen ions lie in the E and D planes respectively, with an empty F plane between these ions. The E and D planes are both $\frac{1}{4}$ occupied by the oxygen ions. Accordingly, these ions are represented by opening the D plane selector switch, closing the E plane selector switch, opening the row switches 30, and closing one of the column subgroup switches 28, for example, switch a. This procedure illuminates one-quarter of the display lights in the E plane which represents the first layer of interstitial ion sites. Again using the spheres and rods, the spheres may be positioned with their centers above the illuminated areas and may be fixed firmly in place with respect to the first layer of closely packed ions by means of the rods. Since no octrahedral sites are occupied, the F plane, which is the next plane in the table previously given, should not be displayed. The next layer of oxygen ions which occupy the tetrahedral sites are displayed on the display panel by opening the E plane switch and closing the D plane switch; the column subgroup switch a remains closed to display one-quarter of the sites in the D plane. Again this plane is represented in the model by placing spheres above the centers of the indicator lights thus displayed and interconnecting the spheres by means of rods. This process may be continued to whatever extent desired and any number of layers in the crystal structure may thus be represented.

As stated previously, the interstitial sites may be described in terms of octahedra and tetrahedra having closely packed atoms or ions at their vertices. If a number of plastic modules are constructed in the shape of octahedra and tetrahedra and colored spheres representing ions are placed at their centers, these "filled" geometric figures may be used directly in the construction of a crystal structure in conjunction with my invention. An example of a "filled" tetrahedron and a "filled" octahedron is given in FIGURES 7a and 7b respectively. As shown in these figures, the tetrahedron 100 has edges 102 and vertices 104. A sphere 106 representing an interstitial ion is positioned at the geometric center of the tetrahedron by means of rods 108 extending between the sphere and the vertices of the tetrahedron. Similarly, the octahedron 110 has edges 112 and vertices 116 is positioned at the geometric center of the octahedron by means of rods 118 extending between the sphere and the vertices of the octahedron. Although any of several methods may be used to construct these modules, they are preferably constructed by forming triangular-shaped pieces of translucent Lucite or similar material and joining these along their edges by cement or other means to form the modules 100 and 110. Examples of such modules are shown in Loeb and Pearsall, "Moduledra Crystal Modules, A Teaching and Research Aid in Solid-State Physics," American Journal of Physics, vol. 31, pp. 190–193 (March 1963).

The use of the modules in conjunction with my invention will now be explained. Again considering cuprite as an example, the octahedral sites are empty while the tetrahedral sites are one-quarter occupied. Referring to Table 1 above for the first five layers, the copper ions, which are cubically closely packed lie successively in the D and E planes respectively, the tetrahedrally coordinated ions lie in the E and D planes, and the octahedrally coordinated ions lie in the F plane. After one-quarter of the tetrahedral interstices in the E plane are illuminated as described above, filled tetrahedra are placed in an upright position on the display surface 12 with their centers above the illuminated portions of the E plane and their three lower corners located above an illuminated position in the D plane. The remaining portion of the tetrahedral interstices in the E plane are represented by unfilled tetrahedra. The empty octahedral interstices are next represented by placing empty octahedra with their centers above the hexagonal net in the F plane, the lower corners of the octahedra being directly above the hexagonal net in the D plane and the upper corners of the octahedra being directly above the hexagonal net in the E plane. The tetrahedral interstices in the D plane, which are also one-quarter occupied, are represented by placing filled tetrahedra in an inverted position with their centers above those positions which have been selected by illuminating one-quarter of the D plane, their apices being place above the hexagonal net in the D plane. Additional layers may be added to the model by continuing this procedure with reference to the table given above. When the model is completed, it will be found that all the space in the model is occupied by either filled or unfilled tetrahedra and octahedra. The use of these modules in conjunction with my invention thus provides a powerful tool for the construction of crystal models and allows even an unskilled operator to rapidly and accurately assemble models for the representation of crystal structure.

Figure 6A:
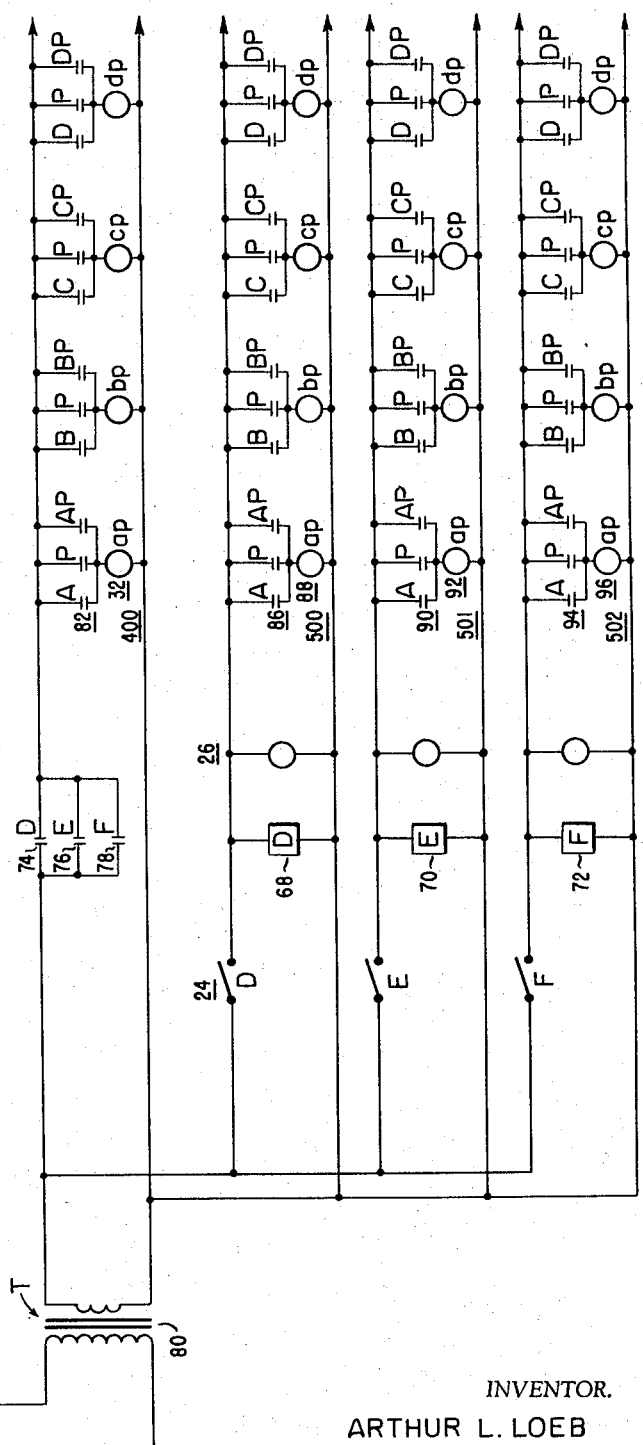
Figure 8:
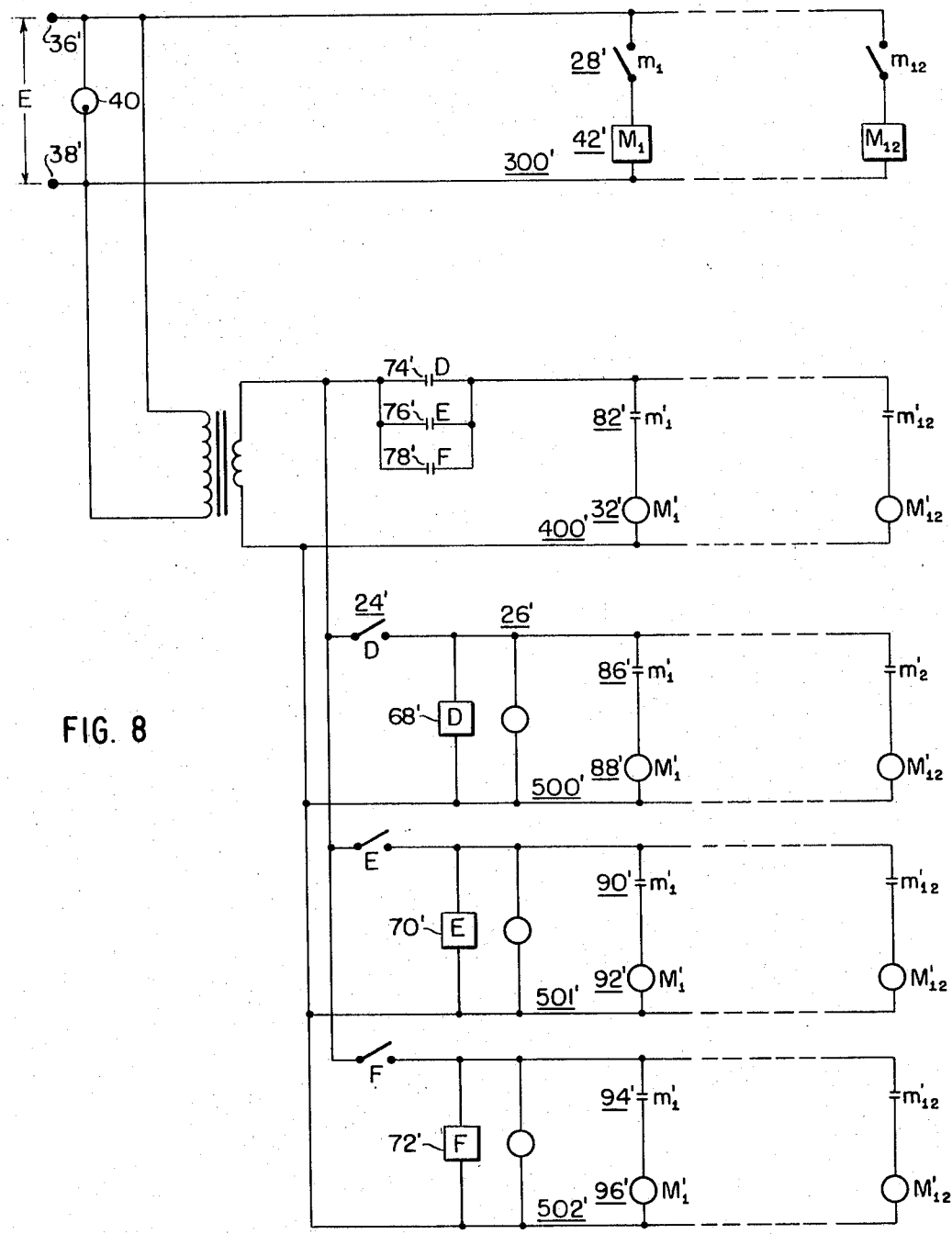
FIGURE 8 is a schematic diagram of a simplified form of switching circuitry that may be used in place of the circuit of FIGURE 6.

FIGURE 8 shows a simplified circuit that may be used in place of the circuit shown in FIGURES 6a and 6b to operate the display panel. The selector panel switching unit 300 contains subgroup switches 28 having 12 individual switches which are labeled m1 through m12 respectively. The switches 28' divide the hexagonal net for each plane into twelve subgroups as was the case with FIGURE 6. It will be apparent, of course, that in a greater or lesser number of switches may be used to divide the hexagonal net into any desired number of subgroups. After the appropriate plane has been selected for display by means of switches 24', closure of any of the switches 28' will energize the corresponding relay M1 through M12 in the subgroup relay unit 42', thus in turn closing one of the corresponding relay-operated switches M1'–M12' in the selector panel indicator switch unit 82', and the display panel indicator units 86' 90' and 94'. Closure of these switches will connect the selector panel indicator lights 32' and the display panel indicator lights 88', 92' and 96' across the secondary of the transformer 80' thus illuminating the respective lights. This circuit is simpler and more economical to construct than the circuit of FIGURES 6a and 6b; however, it does not allow the operator to select a multiple of subgroups for display by the closure of a single switch as is the case with the latter circuit.

I have so far described my invention in terms of a two-dimensional display panel which contains the three basic planes (D, E and F planes) which are sufficient to represent crystal structures. It will be apparent to those skilled in the art that a number of such two-dimensional panels, each containing D, E and F planes, may be stacked one on top of the other, to form a three-dimensional display if desired. The circuits for each such panel may be similar to those shown in FIGURES 6 and 8 if desired.

It will thus be seen that I have provided a simple yet efficient instrument for the representation of crystal structures. Further, I have provided an instrument for the representation of crystal structures which is easy to use even by unskilled operators and which utilizes the inherent symmetry of crystal structures to maximum advantage.

Either a two-dimensional or a three-dimensional display may be utilized as desired, and the two-dimensional display may be used with or without associated modeling elements. It will be apparent that my invention may be used either as an educational device or as a research tool for the study and comparison of both actual and hypothetical crystal structures.

It will thus be seen that the objects set forth above, among those made apparent from the preceding description, are efficiently attained and, since certain changes may be made in the above constructions without departing from the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, I claim:
1. An electrical device for representing crystal structures comprising, in combination:
   display means having a plurality of indicators adapted to be actuated and located to provide a visual representation of the location of atom sites in a crystal, said indicators being located in an array of several groups, each group representing the sites in a crystal plane, whereby said several groups represent the sites in several planes, each of said groups being composed of a plurality of subgroups each subgroup consisting of a predetermined fraction of the sites of said group, and each having a corresponding subgroup in the other groups; and selector means including electrical means associated with each subgroup adapted to actuate said indicators at said predetermined sites of said subgroup and corresponding subgroups, and including means for selectively actuating the indicators at the sites in each group.

2. The combination defined in claim 1 in which said display means comprises a two-dimensional display panel, said indicators comprising means for illuminating selected areas of said panel corresponding to the location of atom sites.

3. The combination defined in claim 2 in which the locations of atom sites in the crystal are marked by geometric models of octahedra and tetrahedra.

4. The combination defined in claim 2 in which said indicators includes a light bulb for each atom site to be represented.

5. The combination defined in claim 2 in which said means for selecting at least one said group for each crystal plane comprises a plurality of switches, each said switch being associated with at least one of said groups of atom sites.

6. The combination defined in claim 2 in which the indicators associated with said display panel are located at the intersections of lines of hexagonal nets, each group of indicators being associated with a particular hexagonal net.

7. The combination defined in claim 3 in which said selector means includes switch means for selecting at least one group for display.

8. An electrical device as defined in claim 2 in which the selector means includes a first set of switches for selecting a group of indicators to be actuated and a second set of switches for selecting a predetermined subgroup of indicators to be actuated.

9. The combination defined in claim 7 in which said selector means comprises first switching means for selecting a group for display, and second switching means for selecting a subgroup of indicators within said group for display, said indicators being operated only when said first and second switching means are operated.

10. An electrical device as defined by claim 8 in which the selecting means includes a switching matrix having a plurality of rows and columns the intersections of each row and column corresponding to a subgroup of indicators.

11. The combination defined in claim 10 in which each group comprises twelve subgroups.

12. The combination defined in claim 10 in which said matrix has an actuating switch for each said row and each said column, all said groups of sites associated with a given row or column being displayed when the respective row or column only is actuated by said switch, a single subgroup of sites being displayed for each row and column intersection when one row and one column are actuated concurrently.

13. The combination defined in claim 12 in which said selector means includes means for displaying a plurality of crystal planes.

14. The device defined by claim 2 comprising a plurality of display panels each display panel having the indicators of one group.

References Cited
UNITED STATES PATENTS

| | | | |
|---|---|---|---|
| 2,317,590 | 4/1943 | Compere | 35—40 |
| 3,110,893 | 11/1963 | Peacock | 340—336 |
| 3,156,985 | 11/1964 | Bliss et al. | 35—18 |
| 3,204,234 | 8/1965 | Nakauchi | 340—336 |

EUGENE R. CAPOZIO, *Primary Examiner.*

P. WILLIAMS, *Assistant Examiner.*